United States Patent

Ragen et al.

[15] 3,678,471

[45] July 18, 1972

[54] ZERO SUPPRESSION CIRCUIT

[72] Inventors: Robert A. Ragen, Hayward; Carl E. Herendeen, Danville, both of Calif.; Gary R. Wood, Albuquerque, N. Mex.

[73] Assignee: The Singer Company, New York, N.Y.

[22] Filed: May 20, 1971

[21] Appl. No.: 145,362

[52] U.S. Cl. .......... 340/172.5
[51] Int. Cl. .......... G06f 3/14
[58] Field of Search .......... 340/172.5

[56] References Cited

UNITED STATES PATENTS

| | | | |
|---|---|---|---|
| 3,286,237 | 11/1966 | Kikuchi | 340/172.5 |
| 3,375,498 | 3/1968 | Scuitta | 340/172.5 |
| 3,388,384 | 6/1968 | Bogert et al. | 340/172.5 |
| 3,388,385 | 6/1968 | Lukes | 340/172.5 |
| 3,449,726 | 6/1969 | Kawamoto et al. | 340/172.5 |
| 3,460,097 | 8/1969 | Kube et al | 340/172.5 |
| 3,537,073 | 10/1970 | Sakoda et al. | 340/172.5 |

*Primary Examiner*—Paul J. Henon
*Assistant Examiner*—Paul R. Woods
*Attorney*—Warren P. Kujawa, Charles R. Lepchinsky, Patrick J. Schlesinger and Jay M. Cantor

[57] ABSTRACT

A zero suppression circuit for suppressing the display of non-significant zeros by the data indicator unit of a data storage system, e.g., the memory unit of an electronic desk top calculator. Each displayed register is individually examined order-by-order; a counter is incremented at the beginning of each examined digit position and is reset to an initial state for each digit position containing a nonzero digit. After each digit position of a register has been examined, zero suppression markers corresponding to the digit positions containing nonsignificant zeros are placed in corresponding digit positions of a different register. When these markers are detected during the display of each examined register, the display unit is disabled.

13 Claims, 10 Drawing Figures

INVENTORS
ROBERT A. RAGEN
CARL E. HERENDEEN
GARY R. WOOD
BY Warren P. Kujawa

TIMING SIGNALS

99

| STEP | 1 | 2 | 4 | 8 |
|---|---|---|---|---|
| EPCZ | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |

| C15 | C14 | C13 | C12 | C11 | C10 | C9 | C8 | C7 | C6 | C5 | C4 | C3 | C2 | C1 | C0 | |
|---|---|---|---|---|---|---|---|---|---|---|---|---|---|---|---|---|
| 1 | 1 | 1 | 1 | 1 | 1 | 1 | 1 | 1 | | | | | | | | R6 |
| 1 | 1 | 1 | 1 | 1 | 1 | 1 | | | | | | | | | | R5 |
| | | | | | | | | | | | | | | | | R4 |
| | | | | | | | | | | | | | | | | R3 |
| | | | | | | | | 5 | 2 | 5 | 3 | 8 | | | | R2 |
| | | | | | | 5 | 4 | 3 | 2 | 1 | 0 | 9 | 4 | 1 | | R1 |
| | | | | | | | | | | | | | | | | R0 |
| | | | | | | | | | | | | | | | | RS |

ZERO SUPPRESSION CIRCUIT

BACKGROUND OF THE INVENTION

1. Field of the Invention

This invention relates to data storage systems having a data indicator unit for displaying the contents of the system, and more particularly to such data storage systems having means for suppressing the display of nonsignificant characters.

2. Brief Description of the Prior Art

Several character suppression circuits are known which are employed to suppress the display of nonsignificant characters contained in a data storage system. Such circuits have found wide use in electronic calculators and small desk top computers for suppressing nonsignificant zeros contained in one or more registers to be displayed.

In a typical calculator or desk top computer, the memory unit is arranged in a plurality of registers, only some of which are displayed. Each displayed register has a fixed number of digit positions, some of which frequently contain zeros. In an electronic desk top calculator having display registers with a 13 digit capacity, e.g., many computations involve less than 13 digits. Display of the entire register, including nonsignificant zeros, when less than all of the digit positions contain significant data, is confusing to the operator and renders the significant data difficult to interpret. This frequently leads to a high incidence of operator error and is, accordingly, undesirable.

To alleviate the above problem, several different types of character suppression circuits have been proposed, each of which has the function of suppressing the display of nonsignificant zeros contained in one or more displayed registers. In each of these circuits, nonsignificant zeros, i.e., zeros to the left of the most significant nonzero digit of a number in a register to be displayed, are suppressed by turning off the data indicator unit during the time for display of those digit positions containing such nonsignificant zeros. If the data indicator unit is a cathode ray tube display, e.g., unblanking signals are suppressed for these digit positions. Where a digital display such as a Nixie tube panel or a light emitting diode panel is employed, appropriate signals are generated for blanking the segment strobe signals for these digit positions.

Known character suppression circuits of the above type suffer from several disadvantages. Some are compatible with only one single type of data indicator unit. Others require several data cycles to generate appropriate character suppression signals thereby greatly increasing the duty cycle of the data storage system, which impairs the speed with which data may be stored and displayed. Still others require special suppression character codes which occupy inordinately large numbers of data sites in the memory unit, thereby reducing the total data capacity of the storage system. Still others require complex and costly special circuitry which greatly increases both the manufacturing costs of the data storage system and also the probability of system malfunction.

SUMMARY OF THE INVENTION

The invention disclosed herein comprises a character suppression circuit which is fully compatible with several types of data indicator units, requires few additional circuit components, employs only available data characters, and requires only two additional duty cycles to generate the character suppression signals for an entire register to be displayed. The character suppression circuit comprises circuitry for sampling each digit position of a register to be displayed, insertion means for placing in a separate register suppression characters corresponding to the number of digit positions containing nonsignificant zeros, means responsive to these suppression characters for generating a disable signal for disabling an associated data indicator unit, and control means for sequentially controlling the operation of the sampling circuitry, insertion means, and signal generating means.

For a fuller understanding of the nature and advantages of the invention, reference should be had to the following detailed description, taken in conjunction with the accompanying drawings wherein like reference characters designate like or similar elements throughout the various views.

DESCRIPTION OF THE PREFERRED EMBODIMENT

Figure 1:
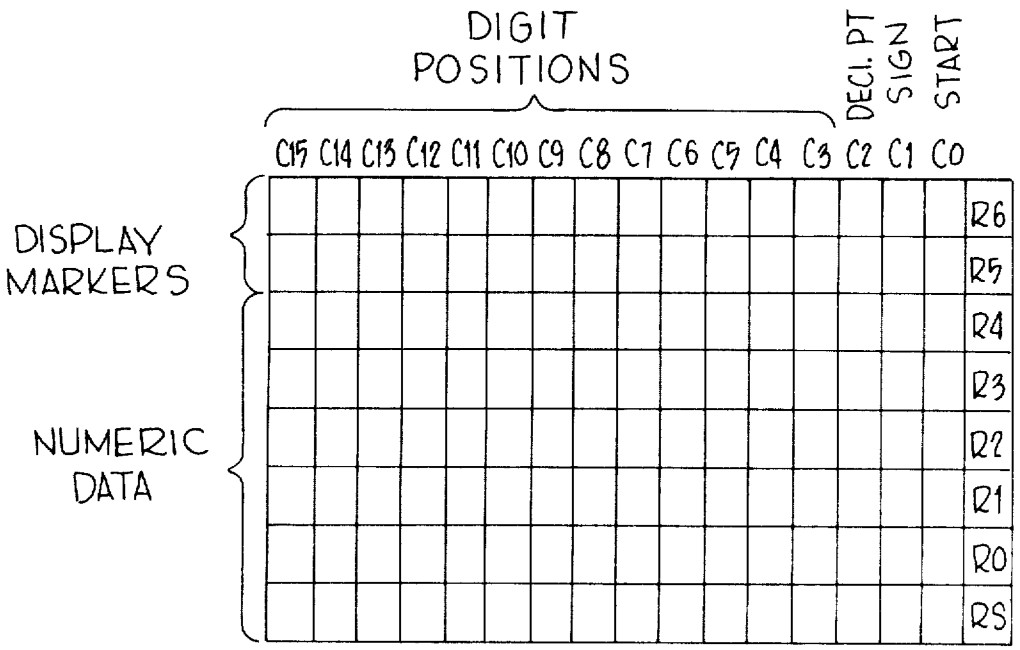
FIG. 1 illustrates the register organization of a memory unit employed in conjunction with a preferred embodiment of the invention.
Figure 2:
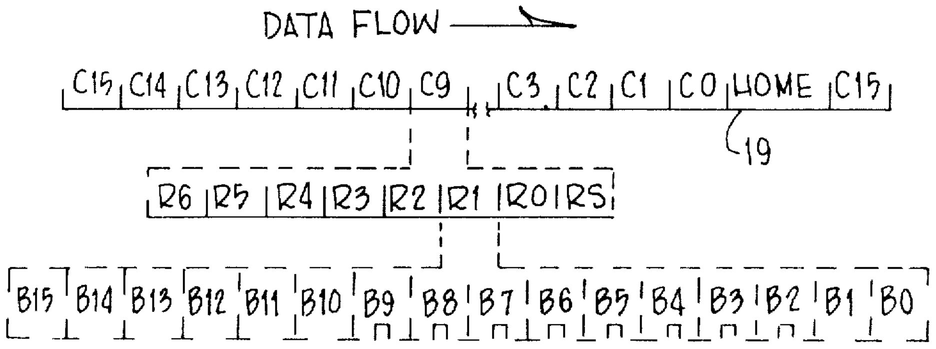
FIG. 2 shows a serial data train embodying the register organization of FIG. 1.

Turning now to the drawings, the invention is described herein in conjunction with a data storage system which comprises a portion of an electronic desk top calculator. The organization of the calculator memory unit is illustrated in FIGS. 1 and 2. FIG. 1 shows an organization of a plurality of registers RS, RO, R1, R2, R3, R4, R5, and R6, each having a plurality of digit positions C) through C15. As will be apparent to those skilled in the art, this organization may be achieved in various ways, such as by a magnetic core memory (with the number of cores at each data location being determined by the code used), one or more tracks on the magnetic drum, or the like. In the preferred embodiment of this invention, the register organization of FIG. 1 is realized by a serial data train which is recirculated through a suitable delay device, such as an acoustic delay line. This serial data train is arranged, as shown in FIG. 2, with the digit positions of the registers interlaced such that like orders C of digit positions of each register occur as a group with the lowest order digit position being first in time and the highest order digit position being last in time, the direction of data flow being to the right as indicated by the arrow. For example, column time C9 includes the like order data positions of each register RS, RO, R1, R2, R3, R4, R5, and R6, with the lowermost register RS digit position occurring first and the uppermost register R6 digit position occurring last. Each complete occurrence of the data train C) through C15 is followed by a HOME period 19 during which time no signals or data occur and after which the entire data train is repeated.

In the above organization, the first column CO contains a start pulse or signal which indicates the end of the HOME period and the beginning of a new serial data train, CO–C15. The contents of the column C1 digit position are the individual sign bits corresponding to each numeral, if any, in associated registers RS, RO, R1, R2, R3, and R4. In the preferred embodiment, a 1-bit in the C1 digit position specifies a negative number while a zero bit in this position specified a positive number. The contents of column C2 digit position are the individual decimal point bits corresponding to each numeral, if any, in associated registers RS, RO, R1, R2, R3, and R4. A 4, e.g., in the C2R1 digit position indicates that the numeral contained in register R1 has four digits to the right of the decimal point. These decimal point bits are used to control decimal point control circuitry embodied in the calculator for purposes of calculation and display. Since this decimal point circuitry is not vital to an understanding of the invention, it has not been disclosed herein in the interest of clarity and conciseness. The digit positions of each of the remaining columns C3–C15 contain the digits of the number, if any, in each associated register.

In the preferred embodiment, each digit position utilizes a pulse count notation such as is illustrated in FIG. 2 for the ninth order C9 of the register R1. Each digit position contains 16 BO–B15 time spaces, only nine of which, B2–B10, are used to provide pulse notations for each of the digits, 0 through 9. For example, a one is denoted by a pulse in the time period B2, a two denoted by the pulse in each time period B2 and B3, a three is denoted by a pulse in each time period B2, B3, and B4, etc., with a zero being indicated by the absence of any pulses in the time periods B2–B10. Thus, FIG. 2 illustrates an eight in the C9 digit position of the Register R1.

Figure 5:
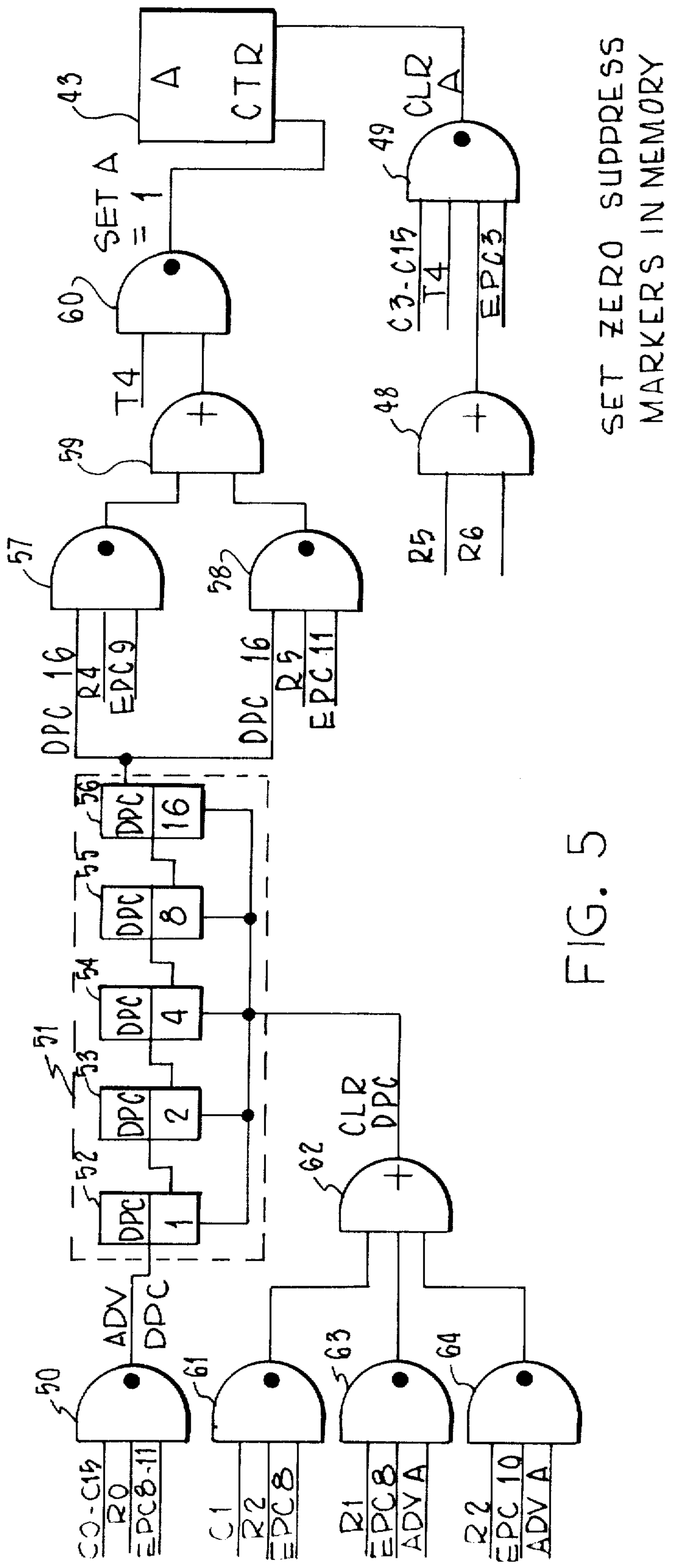
FIG. 5 is a block diagram of a portion of the invention used to insert appropriate character suppression markers in the memory unit.

As illustrated in FIG. 1, registers RS, RO, R1, R2, R3 and R4 are each reserved for numeric data, while registers R5 and R6 are each reserved for the character suppression markers generated by the circuitry of FIG. 5. As discussed more fully below, register R5 is used to contain the character suppression markers associated with the numeric data in register R1, while register R6 is used to contain the character suppression markers associated with the numeric data in register R2. As will be evident to those skilled in the art, additional marker registers could be provided, if desired, to contain character suppression markers associated with the numeric data in registers R3 and R4.

Figure 3A:
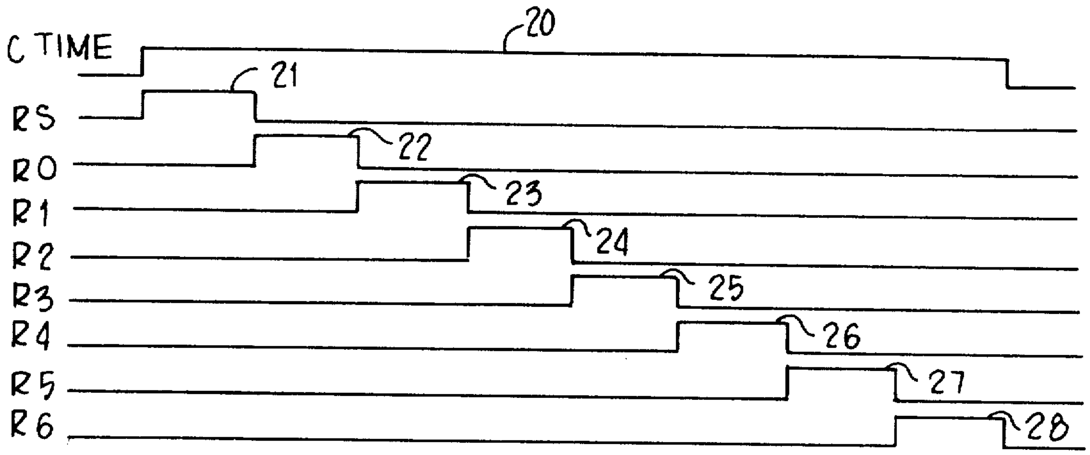
FIGS. 3A and B illustrate appropriate timing signals used to control a data storage system employed in conjunction with the invention.
Figure 3B:
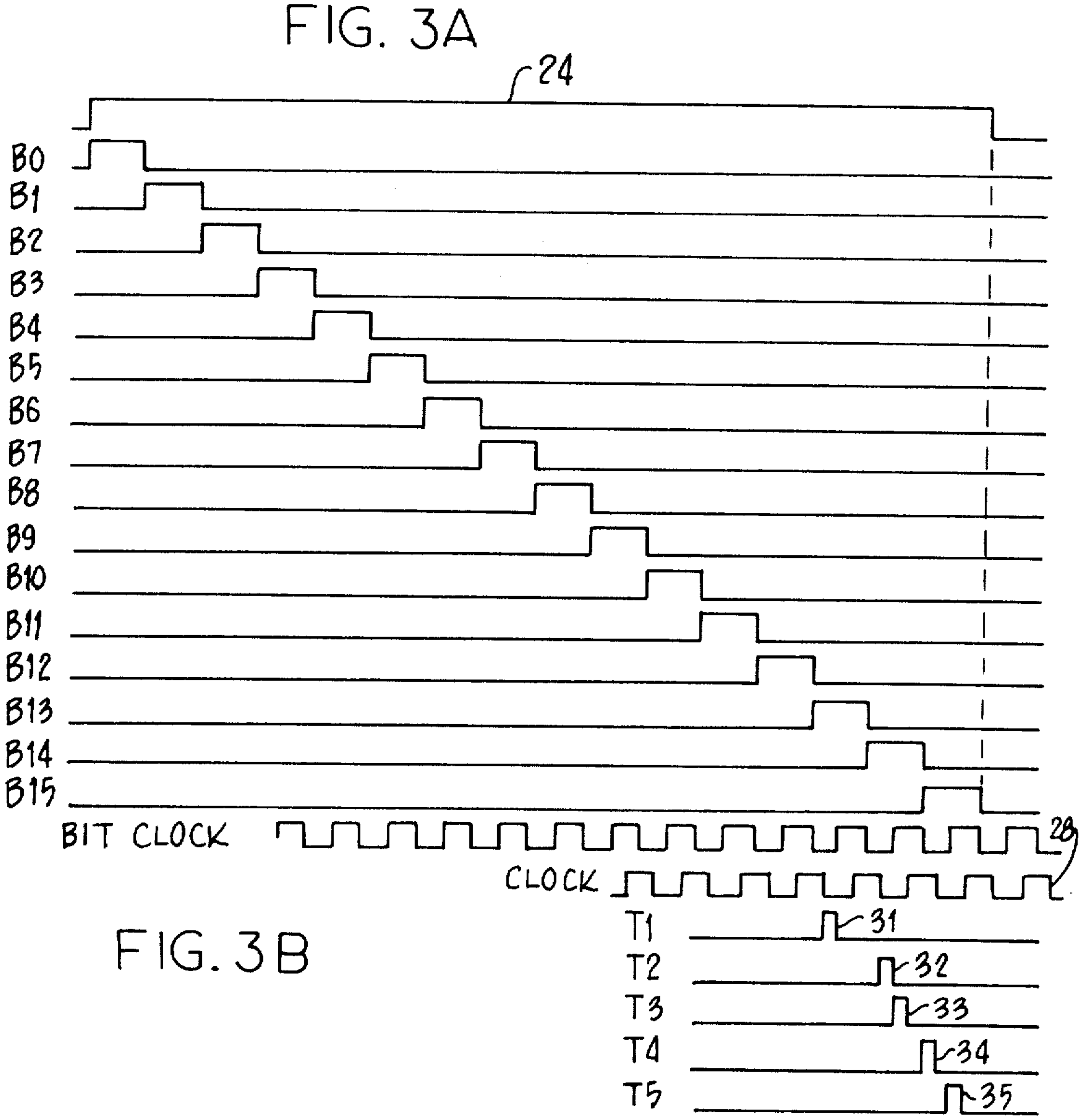

The register organization illustrated in FIG. 1 is accessed in an interlaced, serial manner as shown in FIG. 2 by means of recurring control and timing signals such as illustrated by FIGS. 3A and 3B. Referring now to FIG. 3A, there is illustrated a single column C signal 20. For purposes of simplicity and clarity, only one column signal is illustrated. As will be apparent to those skilled in the art, however, the column signals will occur sequentially, there being one such signal for each of the columns CO–C15. For each column signal, there are eight independently occurring register signals 21–28, one for each of the eight registers RS, RO, R1, R2, R3, R4, R5, and R6, respectively, with the register RS control signal 21 occurring first in time and the register R6 control signal 28 occurring last in time as shown in FIG. 3A. As will now be apparent, the simultaneous occurrence of a column C signal and one register signal determines the occurrence, or accessibility, of a particular digit position CO–C15 of a particular register with like order register digit positions occurring consecutively for each column.

As discussed above, each register digit position includes 16 BO-B15 time spaces. Access to such time spaces is accomplished by 16 independent and consecutively occurring signals as illustrated in FIG. 3B for the register R2 control signal 24 of FIG. 3A. FIGS. 3A and 3B thus illustrate control signals that may correspond to each of the 16 time spaces BO–B15 of each register digit position and each digit position CO–C15 of each register.

The signals illustrated in FIGS. 3A and 3B can be generated by any number of well-known means, such as by applying the output 28 of a square wave oscillator, or clock, to a series of counters, the outputs of selected states of which are gated. In the preferred embodiment of the invention, the clock signal generator is activated by the start of the serial data train, CO–C15 (shown in FIG. 2), and inactivated during the time interval between successive data trains, that is, during the occurrence of the HOME period 19. Also, for reasons that will become apparent from the description below, subsequent to the time period for each time space during which the serial pulse count notation may occur (B2–B10), but before the end of the digit position time period, a series of five independent, consecutively occurring T signals are generated. These signals, T1–T5, denoted by the reference numerals 31–35, respectively, are used to initiate various control operations, such as setting various counters to zero, transferring digit information from one counter to another, and the like. It is to be understood that the timing and control signals shown in FIGS. 3A and 3B merely illustrate one way of accessing a register organization as shown in FIG. 1 and that various other signal arrangements may be devised to accomplish this same purpose.

Figure 4:
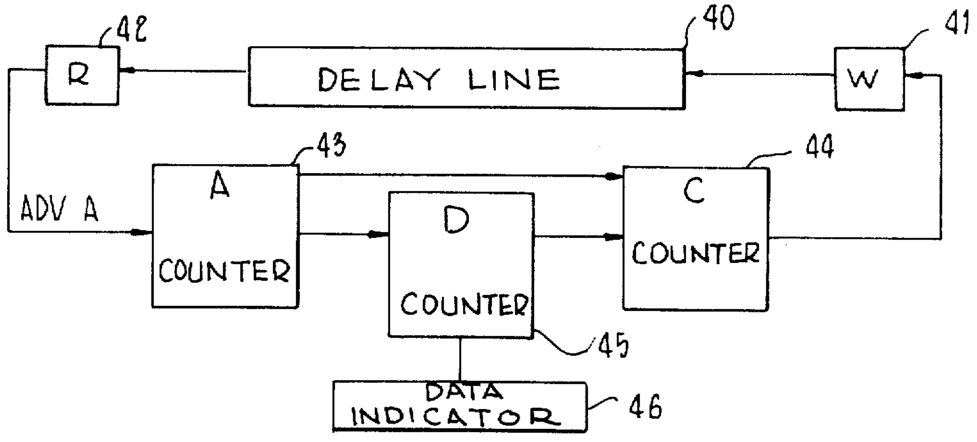
FIG. 4 illustrates in block diagram form the general organization of the data storage system.

FIG. 4 illustrates in block diagram form the general organization of the data storage system of the above-mentioned calculator employed in conjunction with the preferred embodiment of the invention. A serial memory device 40, such as an acoustic delay line, has write 41 and read 42 transducers associated with opposite ends thereof. Associated with the delay line are three registers, or counters, 43–45 for providing two external data recirculation paths for a data train, such as illustrated in FIG. 2. Each counter is adapted to store a single digit (zero through nine). The A counter 43 receives the serial data emanating from the delay line 40 and is adapted to be counted either up or down. Digit data in the A counter 43 can be transferred in parallel to the C counter 44 which is adapted to be counted down in order to serially place the data therein onto the delay line 40. The data recirculating through the delay line 40, A counter 43, and C counter 44, can be further transferred in parallel from the A counter 43 to the D counter 45, and left therein to provide character selection signals for data indicator unit 46. Data indicator unit 46 may comprise a cathode ray tube display device, a Nixie type display panel, a light emitting diode display panel, a digital printer, or in general any digital indicating device known to those skilled in the art capable of providing a readable indication of the digital character contained in D counter 45.

The operation of the data storage system of FIG. 4 is such that each digit emerging from the delay line is counted into the A counter 43 so that each pulse of the digit causes the A counter 43 to advance one count. It is noted that each acoustic pulse emanating from the delay line 40 is converted by read transducer 42 into a corresponding electrical pulse termed an advance A signal, abbreviated hereinafter as ADV A. The digit is then shifted, in parallel, into the C counter 44 by the occurrence of a T1 signal 31 (see FIG. 3B), and the C counter 44 is then counted down by appropriate clock signals to a zero configuration. Each down count of the C counter 44 results in a pulse being launched on the delay line. After the digit is shifted from the A counter 43 to the C counter 44, the A counter 43 is caused to be zero set by the occurrence of a T4 signal 34 (see FIG. 3B) so that the next digit to emerge from the delay line may be counted into it.

The digit transferred from A counter 43 into the C counter 44 is also shifted in parallel into the D counter 45 by the occurrence of T3 signal 33 (see FIG. 3B). Once in the D counter, the digit is used to provide character selection signals for data indicator unit 46. If the data indicator unit 46 is a CRT device, e.g., the output signals from the individual D counter flip-flops may be coupled to several gates used to selectively unblank the cathode ray tube beam in a known manner to generate a visual display of the character stored in the D counter. Other arrangements will occur to those skilled in the art.

In the preferred embodiment, the contents of registers R1 and R2 are alternately displayed by placing the contents of each digit position of one of these two registers serially into D counter 45 in ascending order of significance and then placing the contents of each digit position of the other one of these two registers serially into D counter 45, it being remembered that the contents of the least significant digit position of each register appear first at the output of delay line 40 and the contents of the most significant digit position appear last. Each digit so placed in D counter 45 is held therein for a total of eight register times, during which time that digit controls the generation of character selection signals. At the occurrence of an appropriate T2 signal (FIG. 3B) the D counter 45 is cleared and another digit is thereafter shifted in parallel from A counter 43 to D counter 45 by the occurrence of the following T3 signal. This sequence continues until all the digits of a single register have been placed in the D counter 45 and used to control the generation of character selection signals, after which the digits of the alternate registers are so processed.

Thus, when the display operation is initiated by a suitable control signal (discussed below) the least significant digit of register R1 (the contents of C3R1) is shifted in parallel into D counter 45 by the occurrence of a T3 signal during C3R1 time. This digit is held in D counter 45 until the occurrence of a T2 signal during C4R1 time clears D counter 45. The following T3 signal, which also occurs during C4R1, causes the next least significant digit (the contents of C4R1) to be shifted into D counter 45. These consecutive *clear D counter—shift A to D counter* steps continue until the contents of the most significant digit position of register R1 (the contents of C15R1) have been so shifted. Thereafter, the least significant digit of register R2 (the contents of C3R2) is shifted in parallel into D counter 45 by the occurrence of a T3 signal during C3R2 time. This digit is held in D counter 45 until the occurrence of a T2 signal during C4R2 that clears D counter 45. The following T3 signal, which also occurs during C4R2 time causes the next least significant digit (the contents of C4R2) to be shifted into D counter 45. These consecutive *Clear D counter—shift A to D counter* steps continue until the contents of the most significant digit position of register R2 have been so shifted. Thereafter, the least significant digit of register R1 is again shifted from A counter 43 to D counter 45 and the contents of register R1 are again displayed in the manner set forth above. The alternate display of registers R1 and R2 continues so long as the above-mentioned control signal is present.

As will now be evident, during the display operation of the data storage system shown in FIG. 4, the contents of each digit position of each of the registers to be displayed are shifted in parallel into the D counter 45 and used to control the generation of character selection signals. The numerical data in either or both of these registers may comprise a numeral whose most significant nonzero digit may be located in some position other than the most significant digit position C15R1 or C15R2. In such a case, the remaining higher order digit positions will all contain nonsignificant zeros. For example, if the numeral in register R2 is 52538, the most significant nonzero digit will be located in the C7R2 digit position and digit positions C8R2–C15R2 will all contain nonsignificant zeros. As noted above, display of these nonsignificant zeros is highly undesirable. The character suppression circuit for suppressing display of these nonsignificant zeros will now be described.

FIG. 5 shows a preferred embodiment of a portion of a character suppression circuit which is utilized for inserting character suppression markers into the memory unit of an associated data storage system. As shown in FIG. 5, this portion of the character suppression circuit provides two input signals to A counter 43: a CLEAR A signal (hereinafter designated CLR A) and a SET A = 1 signal. The former signal, when present, clears A counter 43 to the zero state; the latter signal, when present, sets A counter 43 to a count of 1.

Timing signals R5 and R6 (see FIG. 3A) are coupled to the input of an OR-gate 48. The output of OR-gate 48 is coupled to an input of AND-gate 49 along with timing signals C3–C15, T4 and EPC3 signal. The latter signal is obtained from a sequence control counter termed the entry phase counter (hereinafter designated EPC100) described below with reference to FIG. 8, and will be present whenever EPC100 holds a count of 3. When the input signals are concurrently present at the input of AND-gate 49, CLR A signal will be generated and coupled to A counter 43 to clear this counter. These logic elements are used to clear marker registers R5 and R6 of any character suppression markers prior to the sampling of the contents of registers R1 and R2 and the generation of new character suppression markers corresponding to the numeric data contained therein.

Timing signals CO–C15 and RO are coupled to the input of an AND-gate 50 along with EPC8–11, the latter being present whenever EPC100 holds a count of 8, 9, 10, or 11. The output of AND-gate 50 termed advance decimal point counter (hereinafter designated ADV DPC) is coupled to the toggle input of flip-flop 52, the first of five flip-flops 52–56 which together comprise decimal point counter 51. As will be evident to those skilled in the art, decimal point counter 51 comprises a scale of 32 counter, the reset output of each preceding flip-flop being coupled to the toggle input of the next succeeding flip-flop. Decimal point counter 51 is so designated since it may comprise the decimal point counter of the electronic desk top calculator with which the character suppression circuitry is associated.

The set output of decimal point counter flip-flip 56 is coupled to one input of a pair of AND-gates 57, 58. The other inputs to these gates are R4 and EPC9, the latter being present whenever EPC100 holds a count of 9; and R5 and EPC11, the latter being present whenever EPC100 holds a count of 11, respectively. The output of each of AND-gates 57, 58 is coupled through an OR-gate 59 to one input of AND-gate 60, the other input to which is a T4 signal (see FIG. 3B). The output of AND-gate 60 is coupled to A counter 43.

Timing signals C1 and R2 along with EPC8 signal are coupled to the input of an AND-gate 61, the output of which is coupled to an OR-gate 62 along with the outputs of AND-gates 63 and 64. The input signals to AND-gate 63 comprise timing signal R1, EPC8 signal and ADV A signal, the latter signal being obtained from read amp 42 (FIG. 4). The input signals to AND-gate 64 comprise timing signal R2, EPC10 and ADV A signal. The output of OR-gate 62 termed clear decimal point counter (hereinafter designated CLR-DPC) is coupled to the clear inputs of decimal point counter flip-flops 52–56.

In operation, when EPC100 steps to a count of three, old character suppression markers are erased from marker registers R5 and R6 by the action of gates 48 and 49. AND-gate 49 generates a CLR A signal for each digit position C3–C15 of marker registers R5 and R6. Each character suppression marker is read into A counter 43 during its respective column and register time. At the end of that respective column and register time, the occurrence of a T4 signal results in the generation of a CLR A signal, which results in a zero in that digit position. This step of erasing of the old character suppression markers is accomplished during a single pass of the serial data train (FIG. 2) through the counter portion of the data storage system shown in FIG. 4.

After the old character suppression markers have been erased, EPC100 is stepped to a count of 8 in the manner described below with relation to FIG. 8. When RO signal appears at the input of AND-gate 50, the concurrence of this signal and timing signal CO–C15 and EPC8 signal causes this gate to produce an ADV DPC signal to toggle decimal point counter 51. Thereafter, decimal point counter 51 is advanced one count for each remaining column position C1–C15. The concurrence of timing signals C1 and R2 at the input of gate 61 when EPC100 holds a count of 8 causes that gate to produce an output signal which is applied through OR-gate 62 to the clear inputs of decimal point counter 51, thereby resetting this counter to zero. This is a precautionary measure to ensure that decimal point counter 51 begins counting from zero at the beginning of the first digit column position, i.e., column C3.

For the remainder of the data pass of the serial data train, decimal point counter 51 is incremented during each RO time and reset to zero during each R1 time whenever a particular register R1 digit position contains a nonzero digit. This is achieved as follows. Whenever there is a concurrence of R1, EPC8 and ADV A signals at the input of AND-gate 63, this gate produces an output signal which is applied through OR-gate 62 to the clear inputs of decimal point counter 51. ADV A signal, it will be remembered, will be present whenever a pulse is read by read amp 42. It will be further remembered that the presence of a pulse in a given digit position indicates that the digit located therein is at least 1. Thus, the concurrence of ADV A and R1 signals indicate that a particular digit position of register R1 contains a nonzero digit (the digits 1–9). Since decimal point counter 51 is advanced by a count of 1 for each digit position of register R1, and cleared to zero whenever a nonzero digit is located in that digit position, at the end of the data train (C15R6) decimal point counter 51 will hold a count equal to the number of digit positions to the left of the most significant nonzero digit in register R1. Stated otherwise, at this time (C15R6) decimal point counter 51 holds a count equal to the number of nonsignificant zeros in register R1, i.e., the zeros which are to be suppressed. This step of counting the number of nonsignificant zeros in register R1 is accomplished during a single pass of a serial data train.

After the number of nonsignificant zeros in register R1 has been counted into decimal point counter 51, EPC100 is stepped to a count of 9. During the EPC9 count, the character suppression markers corresponding to the numerals in register R1 are placed in marker register R5. This is accomplished as follows. In a similar manner to that already encountered during the EPC8 count, AND-gate 50 produces an ADV EPC output signal to advance decimal counter 51 by one count for each digit column position C0–C15. When decimal point counter 51 reaches a count of 16, flip-flip 56 sets and EPC16 signal appears at one input to AND-gate 57. As will be apparent to those skilled in the art, the number of consecutive ADV EPC signals required to advance decimal point counter 51 to a count of 16 will depend on the initial state of decimal point counter 51 and will be equal to the 16's complement of the count in decimal point counter 51 at the beginning of the EPC9 count.

Once the EPC9 and DPC16 inputs to AND-gate 57 are qualified, this gate will produce one output signal for each R4 time occurring thereafter. Each such output signal is coupled through OR-gAte 59 to one input of AND-gate 60. Upon the occurrence of a T4 signal at the end of each such R4 time, the output of AND-gate 60 sets A counter 43 to a count of 1. A counter 43 holds this count of 1 until the appearance of the next T1 signal which will occur at the end of the following R5 time. At this time, the 1 count in A counter 43 is shifted into C counter 44 in the manner described above with reference to FIG. 4 and thus enters the serial data train in the corresponding R5 column position.

Once set, flip-flop 56 of decimal point counter 51 remains set for the remainder of the data train. Gate 57 will be conditioned to develop output signals, and a one will be placed in each R5 column position after flip-flop 56 has been set, until the end of the data train (C15R6). At this time, marker register R5 will thus contain the character suppression markers required to suppress the nonsignificant zeros of the numeral contained in register R1. This step of inserting the character suppression markers corresponding to the numeral in register R1 into marker register R5 is accomplished during a single pass of the serial data train.

After the insertion of the last character suppression marker into marker register R5, EPC100 is stepped to a count of 10. The action of the FIG. 5 circuitry during the EPC10 count is very similar to that already described with reference to the EPC8 count. Thus, each ADV DPC output signal from AND-gate 50 advances decimal point counter 51 by one count for each column position at C0–C15. Decimal point counter 51 is likewise reset to zero whenever a particular register R2 digit position contains a nonzero digit. This is accomplished by clearing decimal point counter 51 via OR-gate 62 whenever AND-gate 64 produces an output signal. AND-gate 64 will produce an output signal whenever an ADV A signal from read amp 42 is present at the input of this gate during register R2 time, signifying the presence of a nonzero digit in a particular register R2 digit position. At the end of the serial data train, decimal point counter 51 will hold a count equal to the number of nonsignificant zeros in register R2. This step is likewise accomplished during a single pass of the serial data train.

After the number of nonsignificant zeros in register R2 has been counted into decimal point counter 51, EPC100 is stepped to a count of 11. The action of the FIG. 5 circuitry during the EPC11 count is very similar to that already described with reference to the EPC9 count. Thus, the ADV DPC signals from AND-gate 50 advance decimal point counter 51 by one count for each column position C0–C15. Once decimal point counter 51 reaches a count of 16 after $i$ columns (where $i$ = the 16's complement of the count in decimal point counter 51 at the beginning of this step), flip-flop 56 becomes set and enables the placing of a one count into A counter 43 via gates 58, 59, and 60 once for each occurrence of an R5 and a T4 timing signal. A counter 43 holds each such 1 count until the next T1 signal occurs at the end of the following R6 time, whereupon the 1 count in A counter 43 is shifted into C counter 44 and hence into the serial data train in the corresponding R6 column position.

It is important to note that any character suppression markers contained in register R5 are first shifted from A counter 43 to C counter 44 by the occurrence of a T1 signal, while A counter 43 is not set to a count of 1 until the occurrence of a T4 signal. It will be remembered from the description of FIG. 3B that the T1 signal always occurs prior to the T4 signal. Thus, any character suppression markers in marker register R5 are neither displaced nor destroyed by the action of gates 58, 59, and 60 during the EPC11 count. At the end of a serial data train, marker register R6 will contain the character suppression markers required to suppress the nonsignificant zero of the numeral contained in register R2. This step is also accomplished during a single pass of the data train.

Figure 6:
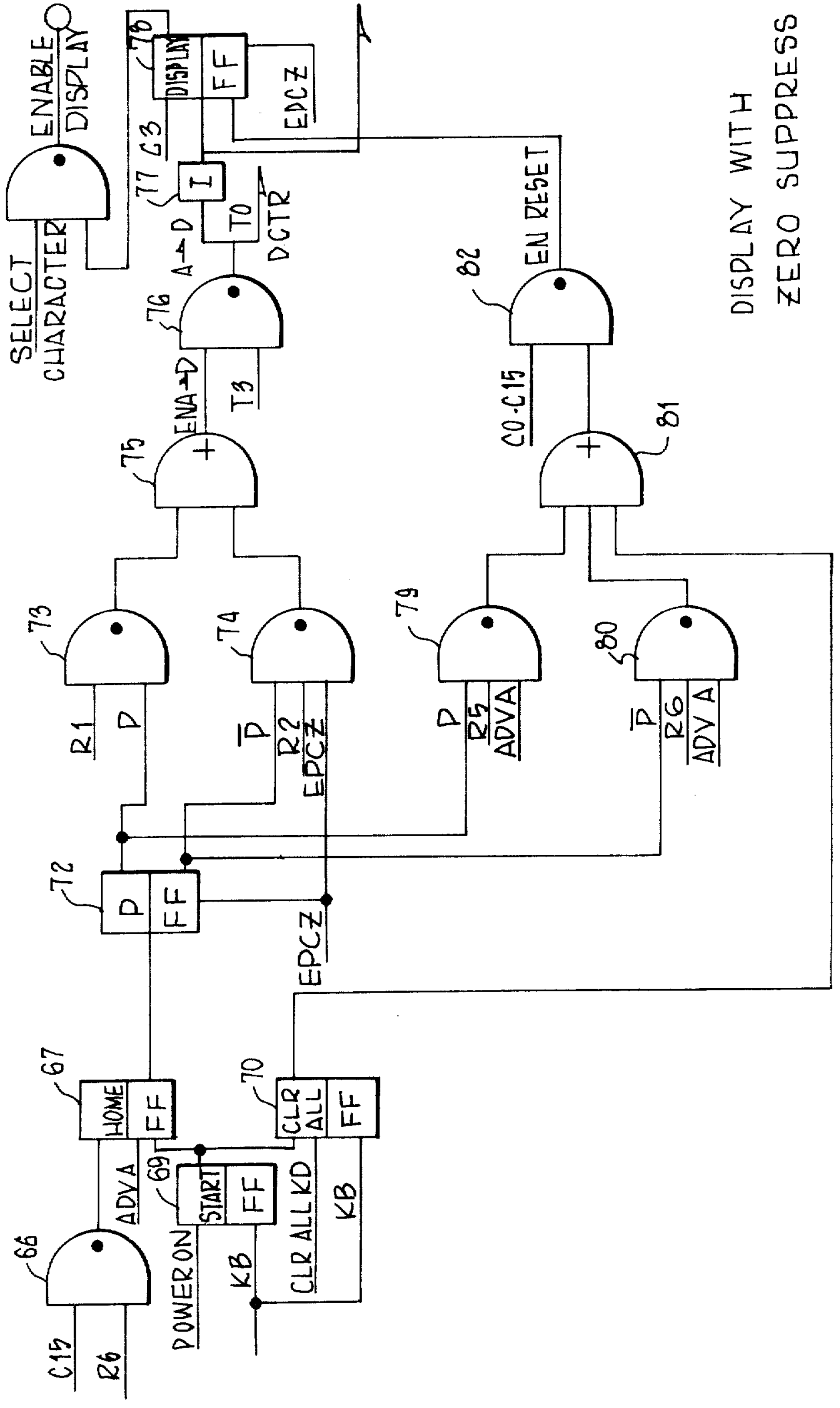
FIG. 6 is a block diagram of a portion of the invention used to disable the data indicator unit to suppress nonsignificant characters.

FIG. 6 shows a preferred embodiment of another portion of the character suppression circuit which is utilized for controlling the state of the data indicator unit 46 to suppress nonsignificant zeros during display of the numerals contained in registers R1 and R2. Timing signals C15 and R6 are coupled to the input of an AND-gate 66, the output of which is coupled to the set input of HOME flip-flop 67 (hereinafter designated HOME FF). ADV A signal and the set output of START flip-flop 69 are each coupled to the reset input of HOME FF 67. As will be evident to those skilled in the art, the appearance of either signal at the reset input of HOME FF 57 will cause this flip-flop to assume the reset state. The set input into START FF 69 is a signal termed power on. This signal is produced whenever power is first applied to the data storage system and may be produced by any one of several known circuits. The reset input to START FF 69 is the set output of keyboard flip-flop 107 (see FIG. 8), hereinafter designated KBFF 107. The set output of KBFF 107 is also coupled to the reset input of CLEAR ALL flip-flop 70 (hereinafter designated CLR ALL FF 70). As discussed more fully below, KBFF 107 is set with one exception whenever a key of a keyboard associated with the data storage system is actuated. The one exception is encountered when a key termed CLEAR ALL (hereinafter CLR ALL) is actuated. Actuation of this key produces the set input to CLR ALL FF 70 labeled CLR ALL KD. The other set input to CLR ALL FF 70 is provided by the set output of START FF 69. For purposes of clarity and conciseness, the above-mentioned keyboard has not been illustrated.

The reset output of HOME FF 67 is coupled to the toggle input of a flip-flop 72 termed the P flip-flop. The state of this flip-flop determines which one of registers R1 and R2 is to be displayed. A signal labeled EPCZ, obtained from EPC100 in the manner described below with reference to FIG. 8 is applied to the clear input of PFF 72. So long as EPCZ is false, PFF 72 is disabled and held in the reset state; when EPCZ goes true, PFF 72 is enabled and can be toggled by HOME FF 67.

The set output of PFF 72 is applied to a first AND-gate 73 along with timing signal R1. The reset output of PFF 72 is applied to a second AND-gate 74 along with timing signal R2 and EPCZ. Both AND-gates 73 and 74 are coupled through OR-gate 75 to one input of AND-gate 76 the other input to which is a timing signal T3 (FIG. 3B). The output of AND-gate 76 is applied directly to D counter 45 (FIG. 4) and also coupled through an inverter 77 to the toggle input of DISPLAY flip-flop 78. The set input to DISPLAY FF 78 is timing signal C3.

The set output of PFF 72 is also coupled to the input of an AND-gate 79 along with timing signal R5 and ADV A signal. The reset output of PFF 72 is further coupled to the input of an AND-gate 80 along with timing signal R6 and ADV A signal. The output of each of AND-gates 79, 80 is coupled through an OR-gate 81 along with the set output of CLR ALL FF 70 to an AND-gate 82, the other input to which is timing signal CO–C15. The output of AND-gate 82 is coupled to the reset input of DISPLAY FF 78.

In the preferred embodiment, DISPLAY FF 78 is a J-K type flip-flop and has the following characteristics. A change of state is effected by the concurrence of a positive level signal at the toggle input and either the set or reset input, followed by the return of the toggle input signal to ground level. In addition, once toggled, the flip-flop can only be changed to the opposite state. Further, as has already been discussed with reference to PFF 72, the CLEAR input to DISPLAY FF 78 prevails over other inputs. Thus, when EPCZ is false, DISPLAY FF 78 is held in a reset condition; when EPCZ is true, DISPLAY FF 78 is conditioned to be toggled.

To illustrate the operation of DISPLAY FF 78, assume the output of inverter 77 is true (A → D signal false) and the flip-flop is reset. When C3 signal goes true, DISPLAY FF 78 is conditioned to be set. When the output of inverter 77 goes false, DISPLAY FF 78 is set. Thereafter, this flip-flop can only be reset. Reset is effected by the concurrence of a true output of inverter 77 and AND-gate 82, followed by the return of the output of inverter 77 to a false level. As will be apparent to those skilled in the art, other types of logic elements than a J-K type flip-flop can be utilized to provide the logic characteristics of DISPLAY FF 78.

The set output of DISPLAY FF 78 is coupled to the input of an AND-gate 83. The other input to this gate termed SELECT CHARACTER is obtained from D counter 45. As noted above, the output of D counter 45 is gated in a known manner to provide segment unblank signals, character strobe signals, or character select signals, depending on whether the data indicator unit 46 (FIG. 4) is a CRT display, a digital panel display or a digital printer. The output of AND-gate 83 generically termed ENABLE DISPLAY furnishes these enabling signals to the associated data indicator unit.

In operation, when power is first applied to the data storage system, the appearance of the POWER ON signal sets START FF 69 which resets HOME FF 67 and sets CLR ALL FF 70. As discussed below, when power is first applied, EPC100 holds a count of zero and thus PFF 72 is conditioned to be toggled from the initial reset state. EPCZ at the CLEAR input of DISPLAY FF 78 also conditions this flip-flop to be toggled from the initial reset state. Since DISPLAY FF 78 is initially in the reset state, gate 83 is disabled and the associated data indicator unit 46 is likewise disabled.

Reset of HOME FF 67 toggles PFF 72 to the set state. For each R1 timing signal which appears thereafter, the output of AND-gate 73 applied through OR-gate 75 conditions one input of AND-gate 76. Upon the occurrence of a T3 signal at the end of each R1 time, AND-gate 76 produces an A → D signal which is inverted by inverter 77 and presented to the toggle input of DISPLAY FF 78. The output of inverter 77 is represented by signal 85 in the timing diagram of FIG. 7.

At the beginning of C3 time, both the set input signal 86 and the toggle input signal 85 to DISPLAY FF 78 will be true. When the output of inverter 77 goes false at C3R1T3 time, DISPLAY FF 78 is set, the set output signal 88 goes true and AND-gate 83 enabled, thereby permitting the display of the contents of D counter. The contents of D counter 45 at that time comprise the C3R1 digit, i.e., the least significant digit of register R1, formerly in A counter 43 and shifted into D counter 45 by the A → D signal at the output of AND-gate 76. Since the data storage system contains no data initially, the C3R1 digit is zero and this zero is displayed to provide an indication to the operator that the system is functioning properly.

It is important to note that CLR ALL FF 70 remains set throughout the operation of the FIG. 6 circuitry during the initial conditions, and thus that output signal 87 of AND-gate 82 remains true this entire time. As noted in the discussion of the operation of DISPLAY FF 78, the presence of signal 87 at the reset input to DISPLAY FF 78 has no effect until this flip-flop is set during C3 time. However, once DISPLAY FF 78 has been set, EN RESET signal 87 conditions this flip-flop to be reset. When the output of inverter 77 goes false at C4R1T3 time, DISPLAY FF 78 is reset, thereby disabling AND-gate 83 and associated data indicator unit 46. Once reset, DISPLAY FF 78 remains reset until the occurrence of another C3 signal, which can only appear after the end of the present data pass. Thus, data indicator unit 46 remains disabled for the remainder of the data pass.

At the end of the data pass, the concurrence of C15 and R6 timing signals at the input to AND-gate 66 causes this gate to produce an output signal which sets HOME FF 67, signifying the end of the serial data train and the beginning of HOME period 19 (see FIG. 2). At the beginning of the next data pass, the start pulse in column CO produces an ADV A signal at the output of read amp 42, which is applied to the reset input of HOME FF 67. As a result, HOME FF 67 resets toggling PFF 72 to the opposite (reset) state. PFF 72 reset disables AND-gate 73 and enables AND-gate 74. For each R2 timing signal which appears thereafter, the output of AND-gate 74 applied through OR-gate 75 conditions one input of AND-gate 76. Upon the occurrence of a T3 signal at the end of each R2 time, AND-gate 76 produces an A → D signal which is inverted by inverter 77 and presented to the toggle input of DISPLAY FF 78.

The action of logic elements 75, 76, 77, 78, 81, 82 and 83 when PFF 72 is in the reset state is substantially identical with that already described. Thus, DISPLAY FF 78 is set after the appearance of C3 timing signal and reset after C4 timing signal appears, permitting display of only a single digit. The digit displayed comprises the contents of C3R2, which is also a zero. As before, display of this zero digit is for the purpose of providing an indication to the operator that the system is functioning properly.

At the end of this second data pass, the concurrence of C15 and R6 timing signal at the input of AND-gate 66, and the subsequent appearance of ADV A signal at the reset input of the HOME FF 67 will cause PFF 72 to be toggled to the opposite (set) state. Action of the circuitry then proceeds as described above.

Figures 7, 9:
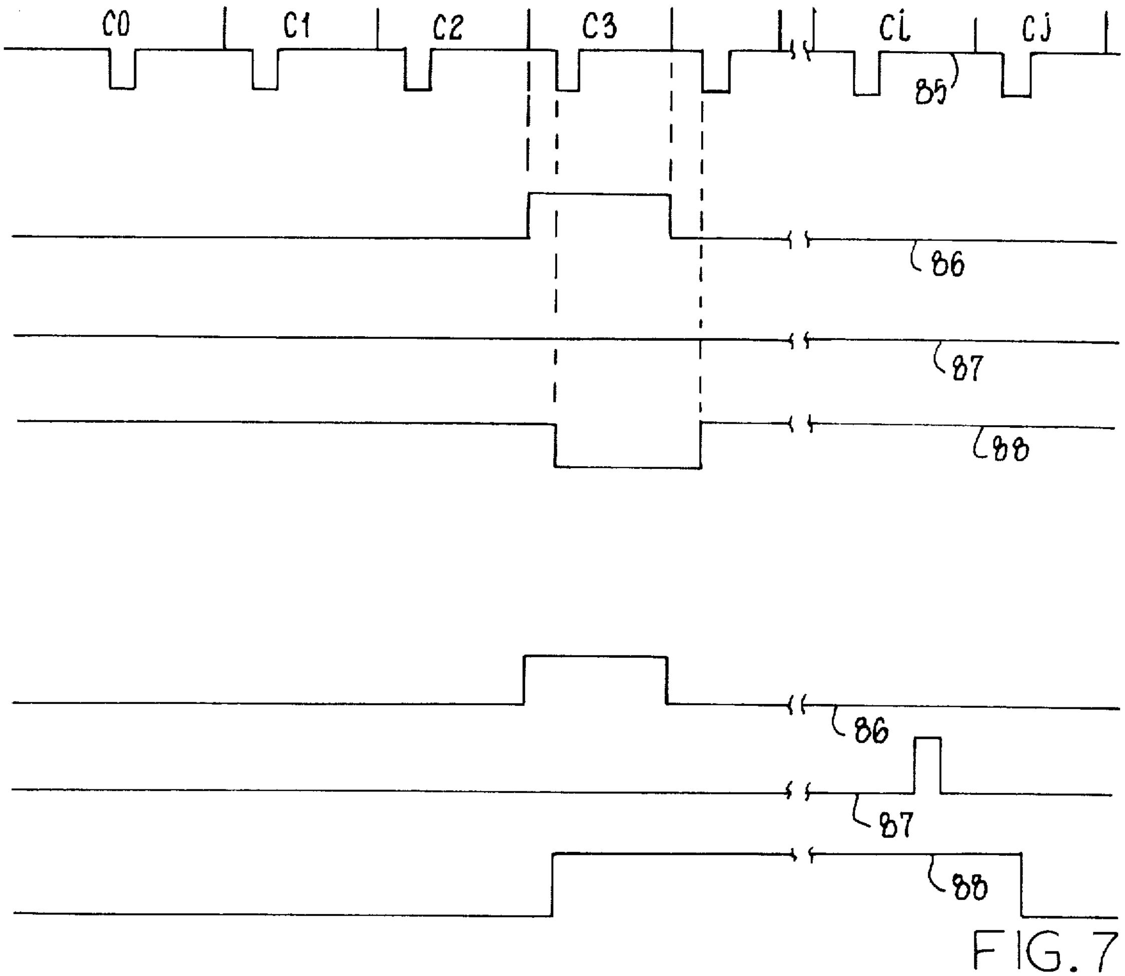
FIG. 7 is a timing diagram illustrating the operation of the FIG. 6 circuitry.
FIG. 9 illustrates the contents of various registers of the memory unit showing the correspondence between data registers and marker registers.

Timing signals 85–88 of FIG. 7 illustrate the relationship between the toggle, set, and reset inputs to, and the set output of, DISPLAY FF 78 during operation of the FIG. 6 circuitry under initial conditions. In FIG. 7, for simplicity, the timing signals C0, C1, . . . , $C_i$, $C_j$ are represented merely as bands separated by vertical partitions at the upper portion of the figure. Also, only one set of toggle input signals 85 are portrayed, it being understood that the negative going portions of toggle input signal 85 which are produced as a result of the action of AND-gate 73 each occur at the end of an R1 timing signal, while the same portions of this signal resulting from AND-gate 74 each occur at the end of an R2 timing signal. As is evident from FIG. 7, DISPLAY FF 78 set output signal 88 goes true at the negative going portion of the toggle input signal 85 during C3 time; this same signal 88 goes false eight register times later at the negative going portion of the toggle input signal 85 during C4 time.

The above-described alternate display of a single zero digit in the least significant digit position of registers R1 and R2 continues until the actuation of one of the keyboard keys, excluding CLR ALL key. Once such a key is actuated, EPC100 steps off zero in the manner described below, clamping PFF 72 and display FF 78 in the reset state. AND-gate 83 is completely disabled until EPC100 again returns to the zero state. In addition, actuation of the first key causes START FF 69 and CLR ALL FF 70 to be reset by the appearance of KB signal at the reset input of each of these flip-flops. Thereafter, gate 82 can only be qualified by the output of either gate 79 or gate 80.

When EPC100 returns to a count of zero, which occurs at the beginning of HOME, (HOME FF 67 set), PFF 72 and DISPLAY FF 78 are again conditioned to be toggled from their reset state. As already described with reference to the operation of the FIG. 6 circuitry under initial conditions, the start pulse in column CO produces an ADV A signal which resets HOME FF 67 and toggles PFF 72 to the set state, thereby conditioning logic elements 73, 75, 76 and 77 to produce a series of toggle input signals 85 to DISPLAY FF 78. DISPLAY FF 78 sets as before at the end of C3R1 time, conditioning AND-gate 83 to permit SELECT CHARACTER signals from D counter 45 to control data indicator unit 46. So long as DISPLAY FF 78 remains set, each register R1 digit transferred from A counter 43 to D counter 45 upon the occurrence of an A → D signal at the output of AND-gate 76 is displayed by data indicator unit 46. After each such transfer and display of that transferred digit, AND-gate 79, which is qualified by PFF 72 set output signal, samples the contents of the corresponding digit position of marker register R5. If an ADV A signal occurs concurrently with an R5 timing signal, indicating the presence of a character suppression marker in that digit position, AND-gate 79 produces an output signal which is applied through OR-gate 81 to AND-gate 82. Since AND-gate 82 is qualified by CO–C15, EN RESET signal is applied to the reset input of DISPLAY FF 78. When the next negative going transition of the output of inverter 77 occurs at the end of the following R1 time, DISPLAY FF 78 resets disabling AND-gate 83 and preventing display of the remaining contents of register R1. Due to the manner in which the character suppression markers are placed in marker register R5, the last displayed digit is always the most significant nonzero digit contained in register R1 while the remaining undisplayed contents are the nonsignificant zeros in this register.

At the end of the data train, the output of AND-gate 66 sets HOME FF 67; this flip-flop is thereafter reset by the appearance of the first ADV A signal. This toggles PFF 72 to the opposite (reset) state, disabling AND-gates 73, 79 and conditioning logic elements 74, 75, 76 and 77 to produce a series of toggle input signals 85 to DISPLAY FF 78. DISPLAY FF 78 sets at the end of C3R2 time, conditioning AND-gate 83 to permit SELECT CHARACTER Signals from D counter 45 to control data indicator unit 46. So long as DISPLAY FF 78 remains reset, each register R2 digit transferred from A counter 43 to D counter 45 upon the occurrence of an A → D signal at the output of AND-gate 76 is displayed by data indicator unit 46. After each such transfer and display of that transferred digit, AND-gate 80, which is qualified by PFF 72 reset output signal, examines the contents of the corresponding digit position in marker register R6. If an ADV A signal occurs concurrently with an R6 timing signal, indicating the presence of a character suppression marker in that digit position, AND-gate 80 produces an output signal which is applied through OR-gate 81 to AND-gate 82. Since AND-gate 82 is qualified by C0–C15, EN RESET signal is applied to the reset input of DISPLAY FF 78. When the next negative going transition of the output of inverter 77 occurs at the end of the following R2 time, DISPLAY FF 78 resets disabling AND-gate 83 and preventing display of the remaining contents of register R2. Due to the manner in which the character suppression markers are placed in marker register R6, the last displayed digit is always the most significant nonzero digit contained in register R2, while the remaining undisplayed contents are the nonsignificant zeros in this register.

At the end of the data train, the output of AND-gate 66 sets HOME FF 67; this flip-flop is thereafter reset by ADV A signal, PFF 72 is toggled to its opposite (set) state and the contents of register R1 are again displayed in the manner already described. This alternate display of register R1 and register R2 continues until EPC100 is stepped off zero by the actuation of a key, by turning off the data storage system or by the actuation of the CLR ALL key. As noted above, actuation of a key causes EPC100 to step off zero, clamping PFF 72 and DISPLAY FF 78 to the reset state, terminating the display operation. Actuation of the CLR ALL key sets CLR ALL FF 70, which immediately conditions AND-gate 82 to produce an output signal for resetting DISPLAY FF 78. Action proceeds as already described with reference to the initial conditions of the FIG. 6 circuitry, i.e., a zero is displayed in the C3R1 and C3R2 digit positions.

Timing signals 85, 86′, 87′, and 88′ of FIG. 7 illustrate the relationship between the toggle, set, and reset inputs to, and the set output of, DISPLAY FF 78 during display with zero suppression. DISPLAY FF 78 set output signal 88′ goes true at the negative going portion of the toggle input signal 85 during C3 time. During $C_f$ time, which corresponds to the digit position containing the first character suppression marker, reset input signal 87′ goes true. When toggle input signal 85 goes false during the next succeeding $C_j$ time, DISPLAY FF 78 set output signal 88′ goes false.

Figure 8:
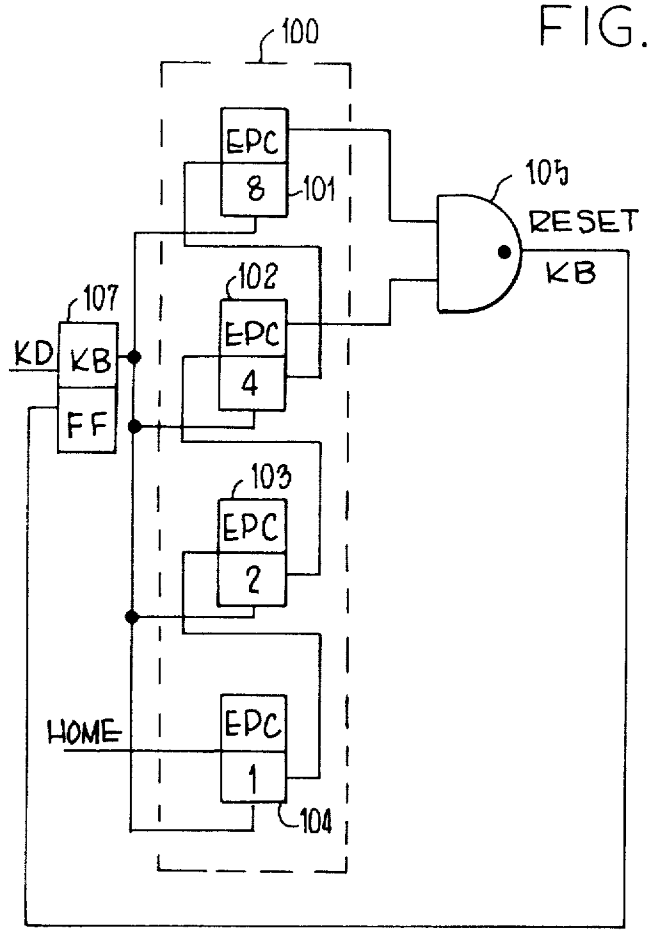
FIG. 8 illustrates one embodiment of a control device for use in the preferred embodiment.

FIG. 8 illustrates a preferred embodiment of the sequential control counter of the invention and a corresponding Truth Table 99. In this figure, EPC100 comprises four flip-flops 101–104 interconnected as a scale of 11 counter. Truth Table 99 indicates the various states of these four flip-flops for each state of EPC100. The HOME toggle input to EPC100 is obtained from the set output of HOME FF 67, and appears once at the end of each data pass. For each appearance of HOME signal, EPC100 is advanced by one count. The set outputs of flip-flops 101 and 102 are coupled to the input of an AND-gate 105. When both inputs thereto are positive, corresponding to a count of 12, AND-gate 105 produces an output signal which resets KBFF 107. When KBFF 107 is reset, an enabling signal from the set output of this flip-flop to the clear inputs of flip-flops 101–104 is removed and EPC100 is clamped to zero. Thus, EPC100 is advanced from 1 to 11 by successive HOME signals and is then reset and clamped to zero. EPC100 is enabled to be advanced whenever KBFF 107 is set by the actuation of a key of the associated keyboard, which produces a KD signal at the set input of KBFF 107.

As noted above, EPC100 is constructed and arranged to attain the zero state when power is first applied to the data storage system. This may be accomplished in any one of several known ways, e.g., by using the POWER HOME signal (see start FF 69 in FIG. 6) to reset KBFF 107.

It is noted that only five counts (EPC3, 8, 9, 10, and 11) of EPC100 are required for the proper operation of the zero suppression circuitry described above. Signals indicating these states of EPC100 may be generated by coupling the various outputs of flip-flops 101–104 to the inputs of several AND-gates in a known way. The remaining counts are used to control other operations of the data storage system which are not vital to an understanding of the invention.

FIG. 9 illustrates the number and relative location of two sets of character suppression markers associated with specific numerals in registers R1 and R2. As noted above, the character suppression markers in register R5 correspond with the numeral in register R1, while those in marker register R6 are associated with the numeral in register R2. Remembering that the contents of column C1 represent the sign of the numeral and that the contents of column C2 represent the number of digits to the right of the decimal point, it is seen that register R1 contains the numeral −543.2109 while register R2 contains the numeral 52538. The first character suppression marker in marker register R5 is located in digit position C9R5, while the first character suppression marker in marker register R6 is located in digit position C7R6. It is noted that the first character suppression marker always appears in the column containing the most significant nonzero digit in the associated numeral register.

With reference to FIG. 5, the character suppression markers are placed in marker register R5 as follows. During EPC 8, decimal point counter 51 is advanced one count during C0R0 and C1R0 by gate 50, and reset to zero during C1R2 by gate 61. Decimal point counter 51 is again advanced by one count during C2R0 and reset to zero during C2R1 by gate 63. Decimal point counter 51 is further advanced by one count during C3R0 and reset by gate 63 during C3R1. Decimal point counter 51 is further advanced by one count during C4R0 but is not reset by gate 63 because no ADV A signal occurs during C4R1. Decimal point counter 51 is further advanced by one count during C5R0 and reset to zero by gate 63 during C5R1. Decimal point counter 51 is alternately advanced and reset by gates 50 and 63 during C6–C9 column times. Beginning with C10 column time, decimal point counter 51 is advanced by one count for each column. Thus, at the end of the data train, decimal point counter 51 holds a count of 6.

During EPC9, decimal point counter 51 is advanced by one count for each column. When decimal point counter 51 is incremented to a count of 16 during C9R0, flip-flop 56 sets and the first character suppression marker is placed in the C9R5 digit position. Thereafter, a character suppression marker is placed in the remaining digit positions C10–C15.

Character suppression markers corresponding to the numeral in register R2 are placed in marker register R6 in a similar manner to that already described.

With reference to FIG. 6, the character suppression markers in marker register R5 control the suppression of nonsignificant zeros in register R1 as follows. With EPCZ present at the clear inputs of PFF 72 and DISPLAY FF 78, and PFF 72 in a set condition, the contents of the register R1 digit position are successively placed in D counter 45 in ascending order of significance and used to control data indicator unit 46. After the most significant nonzero digit 5 contained in the C9R1 position is placed in D counter 45, the first character suppression marker in C9R5 is sensed by gate 79. At the end of C10R1, the next occurring R1 digit position, the output of inverter 77 resets DISPLAY FF 78, disabling the display. DISPLAY FF 78 remains reset until the end of the data train.

The character suppression markers in marker register R6 control the suppression of nonsignificant zeros in register R2 in a similar manner.

As will now be evident, the zero suppression circuit disclosed above provides a powerful and effective means for suppressing the display in a data storage system of nonsignificant zeros contained in each of a number of registers to be displayed. In addition, the character suppression markers employed for this purpose are simple, readily available characters which require no special coding. Further, while the above provides a full and complete disclosure of the preferred embodiment of the invention, various modifications, alternate constructions, and equivalents may be employed without departing from the true spirit and scope of the invention. For example, the memory unit may comprise a permanent storage unit with a plurality of data storage sites each corresponding to a digit position. In such an arrangement, the timing signals may be used to access the individual sites according to a predetermined order. In addition, the order of access of the individual digit positions of each register may be reversed without departing from the spirit and scope of the invention. Therefore, the above description and illustrations should not be construed as limiting the scope of the invention which is solely defined by the appended claims.

What is claimed is:

1. In a character display system including a memory unit provided with a plurality of registers, each having a plurality of digit compartments adapted to contain numeric data, and an associated display unit, a character suppression circuit for preventing the display of the contents of said digit compartments devoid of numeric data, said character suppression circuit comprising:

means for sampling the contents of said digit compartments of at least one of said registers in a predetermined sequence;

insertion means for placing suppression characters in said digit compartments of a different one of said registers corresponding to the number of said sampled digit compartments devoid of numeric data;

signal means responsive to said suppression characters for generating a display disable signal adapted to disable said display unit; and control means for sequentially controlling the operation of said sampling means, said insertion means and said signal means.

2. The apparatus of claim 1 wherein said sampling means includes means for serially accessing said contents in ascending order of significance.

3. The apparatus of claim 1 wherein said sampling means includes means for serially sampling the contents of like order digit compartments of more than one of said registers in a predetermined sequence.

4. The apparatus of claim 1 wherein said insertion means includes an incrementable counter, means for incrementing said counter prior to the sampling of the contents of individual ones of said digit compartments, and means for resetting said counter to an initial state when said sampled contents comprise a nonzero digit.

5. The apparatus of claim 4 wherein said insertion means further includes means for resetting said counter prior to the sampling of the contents of the first said digit compartment.

6. The apparatus of claim 1 wherein said insertion means further includes means for erasing said suppression characters from said different one of said registers, and said control means includes means for enabling said erasing means prior to the enabling of said sampling means and said insertion means.

7. The apparatus of claim 1 wherein said signal means comprises means for examining the contents of said digit compartments of said different one of said registers in a predetermined sequence and for generating an enabling signal when said examined contents comprise said suppression character, means responsive to said enabling signal for generating said display disable signal, and means for enabling said examining means and said generating means.

8. In an electronic calculator having a memory unit provided with a plurality of registers each having a plurality of digit positions adapted to contain numeric data and an associated data indicator unit for indicating the contents of selected ones of said registers, a zero suppression circuit for preventing the indication of nonsignificant zeros in said selected registers, said zero suppression circuit comprising:

means for sampling the contents of said selected registers order-by-order in a predetermined sequence;

insertion means for placing zero suppression characters corresponding to the number of nonsignificant zeros in said selected registers into selected different registers, each of said different registers being associated to a separate one of said selected registers;

signal means responsive to said zero suppression characters for generating a disable signal adapted to disable said data indicator unit; and control means for sequentially controlling the operation of said sampling means, said insertion means and signal means.

9. The apparatus of claim 8 wherein said sampling means includes means for serially accessing each of said selected registers in ascending order of significance.

10. The apparatus of claim 8 wherein said insertion means includes an incrementable counter, means for incrementing said counter prior to the sampling of each said digit position, and means for resetting said counter to an initial count when said sampled contents comprise a nonzero digit.

11. The apparatus of claim 10 wherein said insertion means further includes means for resetting said counter prior to the sampling of the least significant digit position of each said selected register.

12. The apparatus of claim 8 wherein said insertion means further includes means for erasing said zero suppression characters from said selected different registers and said control means includes means for enabling said erasing means prior to the enabling of said sampling means and said insertion means.

13. The apparatus of claim 8 wherein said signal means comprises examining means for examining the contents of said selected different registers order-by-order in a predetermined sequence and for generating an enabling signal when said examined contents comprise said zero suppression character, generating means responsive to said enabling signal for generating said disable signal, and means for enabling said examining means and said generating means.

* * * * *